United States Patent [19]

Delhome

[11] 4,226,046
[45] Oct. 7, 1980

[54] FIGURINE CAPABLE OF GRIPPING A SUPPORT

[76] Inventor: René Delhome, Les Châssis, 26600 La Roche de Glun, France

[21] Appl. No.: 897,185

[22] Filed: Apr. 17, 1978

[30] Foreign Application Priority Data

Apr. 20, 1977 [FR] France ............................... 77 11933
Jan. 25, 1978 [FR] France ............................... 78 02085

[51] Int. Cl.² ............................................. A63H 3/04
[52] U.S. Cl. ....................................... 46/123; 46/154; 46/156; 156/85; 156/163
[58] Field of Search ................. 46/123, 151, 154, 156, 46/161

[56] References Cited

U.S. PATENT DOCUMENTS

| | | | |
|---|---|---|---|
| 3,448,539 | 6/1969 | Hartpence | 46/156 |
| 3,928,933 | 12/1975 | Iwamoto | 46/163 X |
| 4,062,144 | 12/1977 | Holden et al. | 46/151 |

FOREIGN PATENT DOCUMENTS 868616  5/1961  United Kingdom ...................... 46/154

*Primary Examiner*—F. Barry Shay
*Attorney, Agent, or Firm*—Frost & Jacobs

[57] ABSTRACT

A toy figurine capable of clinging to a support, and a process for manufacturing same. The body of the figurine is of compressible resilient material and the limbs are sufficiently rigidly connected to said body to follow deformations thereof and to open when it is nipped in the back. Body and limbs may be formed of one piece of material or may be a composite. The clinging limbs may be biased by using a film of prestressed material secured to a slab of resiliently deformable material. The prestressed material may be made of superposed strips which have been stretched to varying degrees, or of a layer of thermoretractable material. The figurine may be a hand puppet with an opening to admit the user's hand into the head while the puppet is clinging to the user's arm.

12 Claims, 11 Drawing Figures

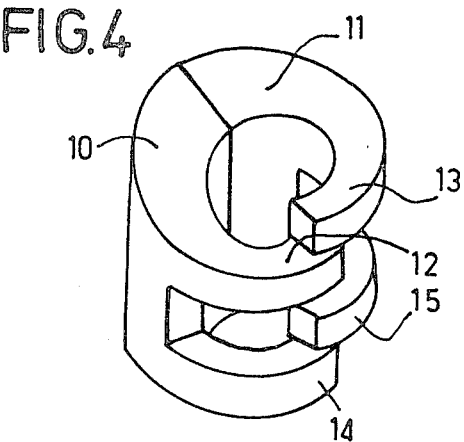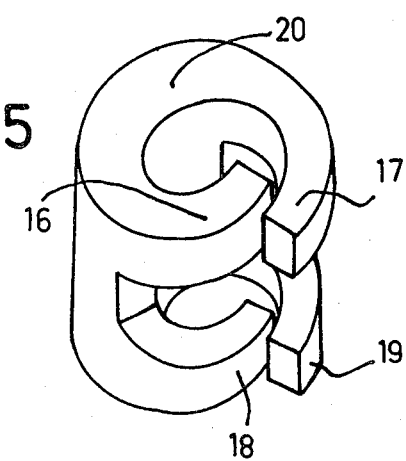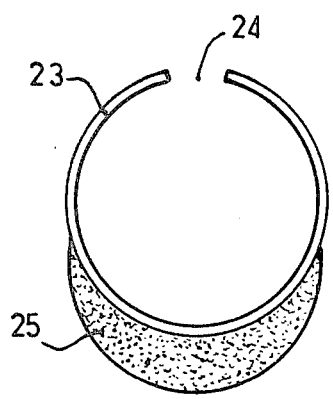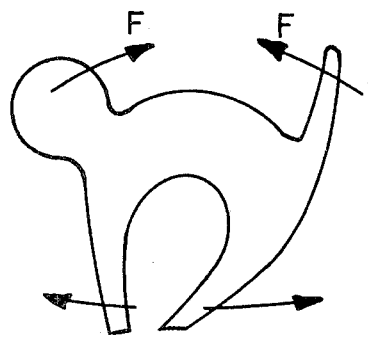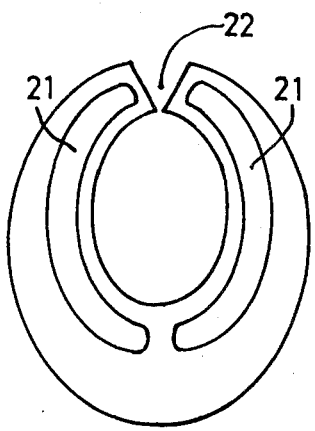

FIGURINE CAPABLE OF GRIPPING A SUPPORT

The present invention relates to a toy figurine capable of clinging to a support and the method of manufacturing same.

The invention relates notably to dolls, soft toys or other similar playthings, and is particularly applicable in the field of marionettes. The figurines capable of clinging to a support now known usually comprise a flexible armature in the form of a clip inside their limbs which permanently urges the said limbs towards one another to enable them to grip, the said armature consisting either simply of a wire or a curved strip of spring steel or plastic such as is the case of the figurine described in the U.S. Pat. No. 3,448,539 or, in a more complex form, of a true clip formed of two articulated arms activated by a spring, as is the case of the figurine which is the object of U.S. Pat. No. 3,928,933. In order to attach to a support a figurine with an armature consisting of a simple wire or strip, both the limbs of a same pair must be grasped simultaneously to separate them and, when the four limbs of the figure are brought together two by two in a resilient manner, the two pairs have to be separated successively, which complicates the attaching operation; furthermore, when a child wants to fix the toy to one of his arms, he can only use one hand to do so, which makes it even more difficult.

This drawback is avoided by armatures consisting of real clips, as they have handles which only need to be pressed by one hand in order to separate the arms; however, these clips are fairly bulky and relatively complicated and, therefore, are costly. Finally, all these armatures, whether they are simplified or not, have the major drawback of constituting a hard core which may injure a child despite the protective padding, which may, in course of time, become pierced, or simply moved inside the toy.

The object of the invention is, therefore, to propose a figurine capable of clinging to a support without making use of an inner armature, and whose limbs can be separated by using only one hand.

A further object of the invention is to propose a very simple method for manufacturing such a figurine and adapted specially to mass production.

According to the invention, the toy figurine comprises a body having at least one pair of limbs having an enveloping form, and means adapted to draw them closer together in a resilient manner so that they can grip a support, but it comprises no hard armature, the means adapted to draw the limbs together consisting essentially of an integral part of resilient compressible material of the figurine body, said integral resilient portion being connected to said limbs.

A method of manufacturing such a toy figurine according to the invention, capable of gripping a support with its limbs of resiliently deformable material, the ends of which are biased resiliently in pairs toward each other, consists essentially in cutting out of a resiliently deformable material a blank having a shape corresponding at least partially to that of the figurine to be obtained, and one of the large surfaces of said blank is preferably contracted permanently transversally, the intensity of said contraction being adjustable to induce it to wind upon itself automatically to a predetermined extent.

Preferably, the resilient deformable material is a plastic spongy foam such as polyurethane foam, and the permanent transversal contraction is obtained on the surfaces of one of the large sides of the blank either by winding same on a heated cylinder and hot forming it substantially to the diameter of said cylinder, or by fixing to the said surface at least one pre-stretched rubber strip, the tension of which is released after fixing, or again by sticking onto the said surface a thermoretractable sheet and submitting the sheet to the action of a heat course.

The invention will now be described in greater detail with reference to particular forms of embodiment mentioned as non-limiting examples and shown in the appended drawings.

FIG. 4 shows a first variant of the toy of FIG. 1;

FIG. 5 shows a second variant of the toy of FIG. 1;

FIG. 6 shows the body of FIG. 1 viewed from above, with reinforced limbs;

FIG. 7 shows a second mode of embodiment of a toy according to the invention;

FIG. 8 shows a diagrammatic view of a second type of toy according to the invention;

Figure 1:
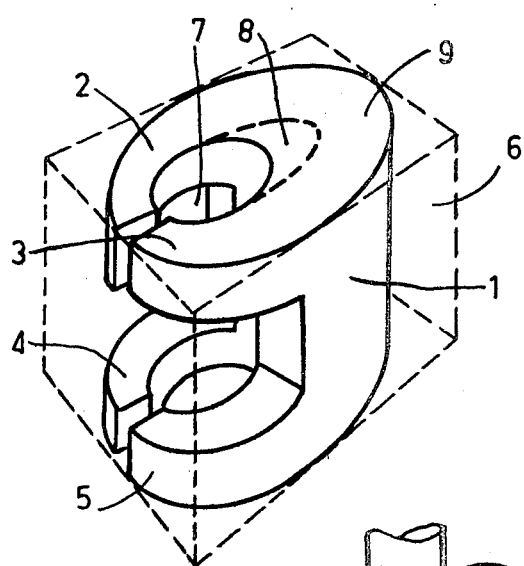
FIG. 1 shows a first form of embodiment of the toy, the body and limbs being cut out of a block of material.

As shown in FIG. 1, the body 1 and fore limbs 2,3 and hind limbs 4 and 5 of the figurine of the invention can be cut in one piece from a slab 6 of compressible flexible material, indicated by broken lines; the limbs are thus connected to the body in an integral manner, without joints, and consequently they follow the deformations to which the body is subjected. In order to facilitate the figurine's being hung on a support, the limbs are cut out in an arc of a circle in such a way that a central passage 7 is formed and the ends of the limbs meet.

Figure 2:
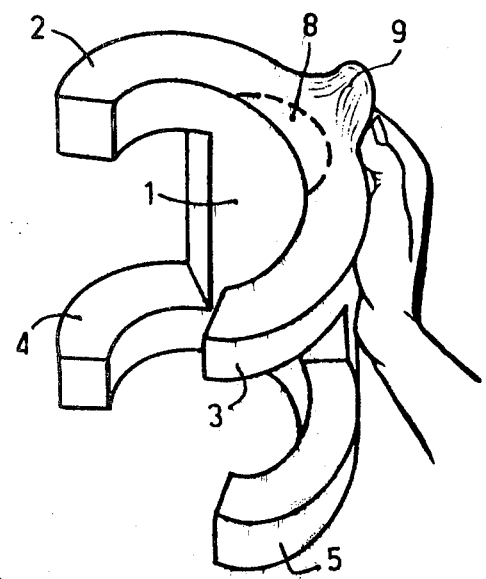
FIG. 2 shows the body of figure 1 nipped to separate the limbs.
Figure 3:
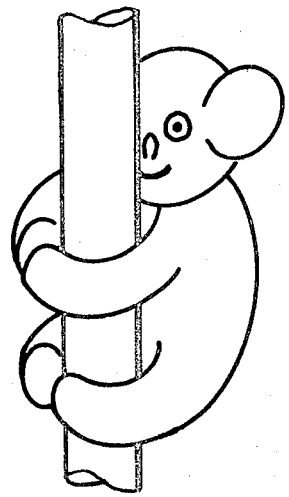
FIG. 3 shows a first type of soft toy according to the invention clinging to a support.

In order to open the said limbs to hang the toy onto a support, as shown in FIG. 3, it is therefore only necessary to pinch the back of the body 1 of the figurine which is resiliently deformed (FIG. 2), the limbs encircling the support when the pressure is released, owing to the resiliency of the body which moves them forward and biases them toward one another.

In order to separate the limbs, a central core 8 must subsist in the body which is not compressed and about which the limbs may pivot; for this purpose, a bulge 9 is preferably provided on the back of the body; the said bulge 9 is formed to be nipped and enables a sufficiently large mass of uncompressed material to be maintained behind the limbs to act as a pivot for same.

It is understood that this central core may be differentiated from the rest by being made of an insert of a different material. The resilient material forming the body which encloses the insert is brought back behind same when the back of the figurine is nipped, thus separating the limbs attached to the body on the opposite side.

Instead of cutting out the limbs so that the ends thereof simply meet in pairs the said limbs may be made sufficiently long for their ends to cross two by two either by being superposed one above the other (FIG.

4), or by crossing one over the other (FIG. 5), in order to improve the clinging properties of the figurine.

In the form of embodiment wherein the ends of the same pair of limbs (12,13), and (14,15) are superposed two by two (FIG. 4), the body is made in two parts 10 and 11 cut out in an identical manner and then glued together top to bottom along a longitudinal plane of said body, whereby the end of the limbs are offset vertically by two and overlap each other.

In the variant shown in FIG. 5, wherein the ends of the limbs 16, 17 and 18,19 are juxtaposed in front of the body 20, the figure is made from a singel piece cut out of a block of spongy foam wherein each pair of limbs is cut out according to a spiral, whereby, because the ends of limbs 17, 19 positioned on a same side overlap at the front, it is possible, in order to attach the figurine to a support, to separate the said members simply by moving the toy laterally in front of the support whereby the ends of limbs 17,19 bear on the said support and are pushed aside.

In order to obtain increased clutching properties, the limbs of the figurine may be made more rigid by glueing on to them (FIG. 6) plastic or cardboard hoops 21 which nevertheless permit bending, it being possible to add the said hoops to the top or bottom surfaces of the limbs or their inner or outer surfaces. Similarly, in order to be able to start to separate the limbs and hang the figurine on a support by simply pushing it towards the latter, the ends of the limbs may be chamfered to form a wedge-shaped inlet 22 (FIG. 6)/.

Instead of being cut out of a block of foam, the body and limbs can be moulded in a spongy material in one piece, or again, it is also possible to envisage joining the limbs to the body which alone may be made, for example, from a slab of foam plastic, the said limbs being solid and internally attached to the body by glueing or any other means.

Similarly, the figurine of the invention may be made of flexible split rings 23 (FIG. 7) of resiliently deformable plastic or other material, cut at 24 to permit their being opened and rigidly secured, by glueing for example, to a slab of spongy foam 25, along an area diagrammetrically opposite slit 24. The rings constitute armatures for the limbs of the figurine and the foam slab 25 forms the portion of the body thereof adapted to be nipped to open the members.

It is understood that the block of foam is covered with plush, for example, and the head of the figurine is added to the body. In the preceeding examples, the members of a same pair are capable of gripping the support, but obviously it is possible to provide for gripping by bringing together the fore and hind legs of the figurine. This is shown diagrammatically in FIG. 8 which shows any animal with fore limbs the ends of which are drawn towards the ends of the hind legs for gripping; it is then only necessary to press the back of the animal to draw the head and the tail towards each other (arrows F) to separate the paws and enable them to grip the support. A toy, such as the one shown in FIG. 8, can be made of spongy foam with rigidified limbs, or of blown plastic which permits resilient deformation of the body while maintaining a certain rigidity of the fore and hind limbs.

Finally, the invention is more specially embodied in an original and amusing manner in making marionettes with the peculiarity of having a body and limbs enabling them to grip a support. According to the invention, the figurines forming these marionettes include an opening in the wrapper forming the outer covering, said opening being made in the neck and preferably in the throat of the marionette, to enable the child's finger to enter the head thereof.

After having attached the toy to one of his arms, the child can slip the fingers of his other hand, or even the whole hand, through the opening in the marionette's throat and into its head, the face mask of which is made of a supple material (such as rubber), and he can then deform the said mask to make it grimace, stick out its tongue, move the nose or ears, etc.

The figures of the invention may, of course, be made of any other resiliently deformable material but polyurethane foam is more particularly recommended because, in addition to the aforesaid characteristics, it is also very light and therefore the limbs need not grip so hard to cause the toy to cling to the support.

According to the above examples, the simplest mode of embodiment obviously consists in cutting out the body and limbs of the said figurine in one piece from a block of plastic foam, the limbs being cut out according to a cylindrical shaped enclosing surface and a circular or elliptical cross section, or in a spiral shape, or a helical surface to form a central passage surrounded by the said limbs.

These figurines may also be made using a minimum number of operations according to the following variants which enable them to be manufactured simply and cheaply, and a very large number of figurines may be mass produced as the operations can be completely automated.

It will be noted that the word "slab" used in the following part of the description should be taken in the most general sense, that is to say an element which is not very thick compared with its other dimensions, a rectangular plate, a disk, or again, a long strip of material are considered to be slabs according to the application.

Figure 9:
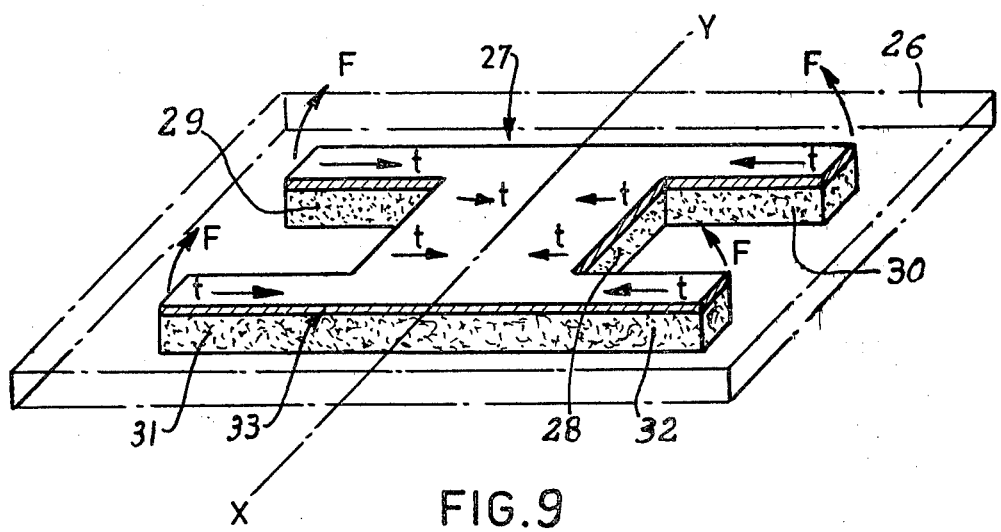
FIG. 9 is a diagrammatic view of a blank of the figurine spread out flat.

As shown in FIG. 9, a toy figurine is made according to the invention starting with a slab of resiliently deformable material 26 laid flat, shown diagrammatically by broken lines in the figure, and which is cut out flat according to the opened out shape of the figure to be obtained.

In this case, the cut out blank 27 is a simple H-shape the cross bar of which forms the body 28 proper of the toy and the side bars form the fore limbs 29,30 and hind limbs 31,32 thereof, the longitudinal axis XY of the figurine actually being parallel to the cross bar of the H.

According to a first variant of the process of the invention, the H-shaped blank 27 is rolled round a cylinder (not shown) having a circumference which is preferably substantially equal to or smaller than the arms of the H; this cylinder is then heated by a suitable means known to a man of the art; to a temperature sufficiently high to permanently preform the blank 27 in the form of a cylinder with a circular (FIG. 10) or helical (FIG. 11) cross section, owing to the shrinkage of a superficial layer 33 of the surface of the blank in contact with the heated cylinder, so that the ends of the fore limbs 29,30 and hind legs 31,32 of the figurine are urged towards each other and may optionally touch (FIG. 10) or overlap each other either in a plane perpendicular to axis XY of the figurine, or in two axially offset planes, the ends of the limbs then being superposed by two; In all cases, the limbs enclose a central space 34 adapted to receive the support which the figurine will grip.

According to a second variant of the process, and still starting with an H-shaped blank 27 cut out on the flat from a well spread out slab 26 of resiliently deformable material (FIG. 9), a strip of resilient material which has previously been stretched in the direction of the arms of the H-shaped blank, i.e., transversally to the axis XY of the figurine to be produced (FIG. 9) is applied to a large surface of the blank, notably by glueing, to form the aforesaid superficial prestressed layer 33.

Figure 10:
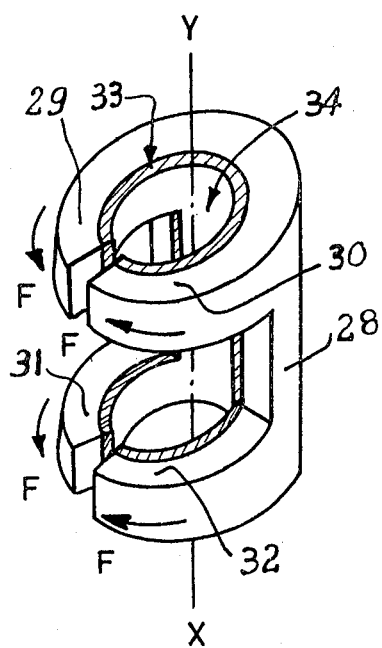
FIG. 10 is a first form of embodiment of the body of the figure obtained from the blank of FIG. 9.
Figure 11:
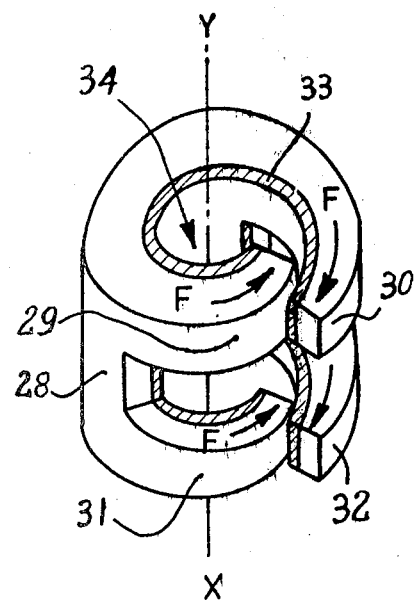
FIG. 11 shows another form of embodiment of the body of the figurine.

The tension of the said strip 33 is maintained until it adhers completely to the blank, the said tension then being released, which inevitably causes the appearance of resilient compression stresses t due to the retraction of strip 33 (FIG. 9) which is exerted in the opposite direction towards the axis XY at the surface of the blank and transversally to a large planar surface thereof and resulting in strains G which tend to being together the ends of the arms of the H and to roll the blank 27 about the longitudinal axis XY, the final result being the formation of one of the two figurine models shown in FIGS. 10 and 11.

Finally, according to a third variant of the mode of embodiment, the aforesaid superficial prestressed layer 33 consists essentially of a thermoretractable film which is glued to one of the large surfaces of blank 27 cut out on the flat in the slab of resiliently deformable material 26.

The blank 27 bearing the superficial layer 33 formed by the glued thermoretractable film is then positioned under a heat source which causes the film to retract and the appearance of compression stresses t directed towards axis XY on the surface of the blank 27 in contact with the thermoretractable film, the opposite surface obviously being subjected to traction stresses; the said stresses causing, as in the previous cases, bending of the limbs 29 to 32 of the figurine and rolling thereof about axis XY according to one of the models shown in FIGS. 10 and 11.

It will be noted that in the three variations of the process of the invention described hereinabove, it is always possible to adjust at will the deformation of the cut out blank 27 and, consequently, the gripping strength of the figurine, this adjustment being obtained, in the first variant, by using various diameters of heating cylinders, resulting in the limbs being more or less tightly wound; in the second variant, by exerting a greater or lesser degree of tension on the strip of elastic material before it is adhered to the blank, the said strip exerting in return a more or less powerful winding couple on the limbs after it has been firmly secured; and finally, in the third variant, it is easily possible to obtain a whole range of windings of the figurine's limbs with extremely varied gripping and "clasping" strenghts by varying the type of thermoretractable film used, and notably the nature of the product itself (polyethylene or PVC), the thickness of the film, whether it is mono or bi-oriented, etc., or also varying the nature of the resiliently deformable material of the blank which constitutes the under-layer of the thermoretractable sheet, according to whether it is more or less flexible, thick, etc, or again, by (varying the heating and cooling conditions of the sheet-heating duration and temperature, rapidity of cooling, etc).

As has been said hereinabove, the process of the invention has very many advantages, notably by its being extremely simple and therefore cheap, and the possibility of being completely automated, and being very versatile as to its embodiment, as it offers innumerable possibilities for modulating the conditions of manufacture and the results it is desired to obtain.

Similarly, the figurines obtained by this process are inexpensive and possess excellent gripping properties without necessitating additional reinforcement of the limbs.

Apart from the fact that both the inner and outer surfaces of the body of the figurine are subjected to superficial tensile stresses instead of only the outer surface being taut as is usually the case when a slab is rolled, the inner surface is then compressed, and the texture of the material forming the body of the figurine varies from the outside to the inside, the said body moreover being composite in the last two variants.

It goes without saying that the scope of these processes is not limited to the modes of embodiment described hereinabove as non limiting examples, but it also covers all variants which only differ in details.

In the second variant, for example, progressive winding of the blank onto itself may be obtained by glueing onto it not one prestretched elastic strips but several elastic strips with different degrees of stretch with respect to one another, obtained by increasing the tension, and glued superposed on one another in increasing order of stretching. In this way, by glueing a first mildly stretched strip to the blank it becomes slightly curved, this curve is accentuated by glueing onto the first strip a second one which is slightly more stretched, and the curve is further increased by glueing onto the second a third one which is still more tightly stretched, etc. so that, by degrees, the desired curve may be adjusted by varying not only the tension of the strips glued to the bloc but also the number of superimposed strips, the "stratification" of the body of the figurine increasing its strenght and the gripping strength of the limbs.

If desired, it is also possible to obtain different limb gripping strengths in the fore and hind limbs by glueing several elastic strips juxtaposed according to the axis XY, the tension of each strip being different to that of the adjacent strip.

Similarly, the gripping properties of the limbs may be modulated transversally instead of longitudinally, for example, by stretching only the right hand side of the elastic strip to a certain tension and glueing it to the part of the blank to the right of axis XY, then when the glue has dried, the left hand side of the same elastic strip is stretched at a different tension, for example, a higher tension, and is then glued to the portion of the blank to the left of axis XY. The limbs to the right or left of axis XY will then have different windings, the left hand limbs being more curved than the right hand ones, the winding will have a spiral form and the ends of the limbs will overlap radially (FIG. 11).

Finally, it is possible to stretch the elastic strips both transversally and longitudinally so that not only do the left limbs bend towards the right ones and vice-versa (FIGS. 10 and 11), but also the front limbs towards the back ones and vice-versa.

The same result could be obtained for the third variant by using a bioriented thermoretractable polyethylene sheet so that, when it is heated, retraction will occur in two perpendicular directions, longitudinal and transversal, thus drawing not only the ends of the fore limbs towards each other but also the end of each fore limb towards that of the hind limb situated on the same side of axis XY.

In the examples described hereinabove, it is recommended that the blank of the figurine should first be cut out of a resilient deformable material before causing one of the surfaces to contract by heating on a cylinder or by adhering to it a stretched strip or a thermoretractable sheet, but, of course, there is no reason why the steps may not be carried out in the reverse order, that is to say, hot preforming or glueing of the strip or sheet may be effected before the slab is cut. Notably, in the case of figurines being manufactured in very large numbers, it is preferable, for example, to continuously glue a strip of thermoretractable sheet onto a strip of resilient material, the two strips being rolled continuously one over the other and moving continously between punch type cutting tools with separate the blanks which are then subjected to the action of a heat source to retract the thermoretractable sheet. The sheet may also be oriented in such a way as to retract it transversely, it is glued, and the two glued strips are moved one on the other under a ramp or through a heating tunnel whereby, after the said heating operation, a channel or tubular sleeve is obtained with joined or superimposed edges which are cut out as it moves along.

Finally, it was previously assumed that the blank was cut out in the shape of an H, the cross bar of the H forming the body of the figurine, the limbs being formed of the four arms of said H, but a figurine may also be manufactured with only the four limbs made of resiliently deformable material, the body being made of a filling material stuffed within the outer plush covering. In this case, the blanks will be simple transversal slabs of resiliently deformable material cut out from a continuous strip of said material, or again, simple longitudinal "sausages" or "bars" cut out of a cylinder of said material, the said blanks, after rolling, are positioned in the hollow arms and legs of the plush covering of the figurine.

What is claimed is:

1. A toy figurine comprising a body having at least one pair of enclosing shaped limbs joined thereto and projecting outwardly therefrom in close relation to each other, and means adapted, upon manipulation of said means, to move said limbs apart and return same close to one another in order for them to cling to a support and maintain the figurine thereon, characterized in that it comprises no hard armature, in that said means adapted to return the limbs close to one another consist essentially of a portion integral with the figurine body made of resilient compressible material, and in that this integral resilient portion is connected to said limbs.

2. A toy figurine according to claim 1, characterized in that said integral portion includes said at least one pair of limbs.

3. A toy figurine according to claim 1, characterized in that said integral portion consists of at least the body of the figurine and that the connection of the limbs and the body is by integral jointure such that they are subject to the deformation of said body.

4. A toy figurine according to any one of claims 1 to 3, characterized in that the body and limbs are in a single piece.

5. A toy figurine according to any one of claims 1 to 3, characterized in that the limbs are attached rigidly to the body with no articulation where they are joined.

6. A toy figurine according to claim 4, characterized in that the body and limbs are cut out of a same block of resilient compressible material.

7. A figurine according to claim 4, characterized in that the body and limbs are moulded.

8. A figurine according to any one of claims 1 to 3, characterized in that the compressible resilient material is a spongy plastic foam.

9. A figurine according to claim 8, characterized in that the material is polyurethane foam.

10. A figurine according to any one of claims 1 to 3, characterized in that respective limbs of each pair are curved towards each other and in that the end of one overlies the end of the other.

11. A figurine according to claim 1, characterized in that it is obtained from a blank cut out of a slab of resilient compressible material and in that the two major surfaces of the said blank are both subjected to tensile stresses.

12. A figurine according to any one of claims 1 to 3, characterized in that it comprises a head provided with an inner passageway in which it is possible to reach the face mask from the inside and in that the entrance to this passageway consists of a front opening under the face and preferably in the throat.

* * * * *